2,693,420

SOLIDIFIED HONEY PRODUCT AND PROCESS FOR MAKING THE SAME

Walter F. Straub, Chicago, Ill., assignor to W. F. Straub & Company, Chicago, Ill., a corporation of Illinois No Drawing. Application June 12, 1953, Serial No. 361,435

20 Claims. (Cl. 99—146)

This application is a continuation-in-part of my co-pending application Serial No. 156,047, filed April 14, 1950.

This invention relates to a novel solidified honey product and to a process for making the same.

Natural honey comprises a sweet sticky fluid collected by bees and deposited and ripened in wax cells forming what is known as the honeycomb. Natural honey varies in color from a yellowish white to light brown depending upon the nature of the flowers from which the honey is produced by the bees. A representative honey analysis is as follows:

| | Percent |
|---|---|
| Water | 17.7 |
| Levulose | 40.5 |
| Dextrose | 34.0 |
| Sucrose | 1.9 |
| Dextrine | 1.5 |
| Mineral matter | 0.2 |
| Miscellaneous substances occurring in relatively small quantities | 4.2 |

For many years honey has been used for baking purposes both by the baking industry and also by housewives. It has long been recognized that honey possesses certain highly desirable properties which make it an extremely valuable sweetening agent for use in place of or in conjunction with sugar. For example, as will be seen from the analysis above, honey contains substantial amounts of levulose and dextrose which are invert sugars or monosaccharides. The monosaccharides may be characterized as being partially hydrolyzed or predigested which condition renders them readily assimilatable in the digestive system as contrasted with the disaccharides and polysaccharides. Consequently, honey is a vastly superior food product and nutrient as compared with other natural sugars. Honey sugars possess a substantially greater sweetening ability than other natural sugars with the result that one gallon of honey containing slightly more than 9 lbs. of total sugar has a sweetening power equivalent to approximately 11¼ lbs. of granulated sugar. In addition, honey is a desirable ingredient in baked goods because it contributes a distinctive quality of freshness and moistness as a result of the hygroscopic properties of levulose contained in the honey.

However, in spite of the widespread recognition of the desirability of using honey in baking, the sticky viscous consistency of liquid honey has been a serious objection on the part of the users and has limited the extent of its use in the baking industry. Thus, the incorporation of honey in a bakery mix by means of the conventional dry powder mixing machines is generally a troublesome and disagreeable step because of the sticky nature of the honey. Furthermore, when using liquid honey an unavoidable loss on the order of 5% or more is commonly experienced as a result of the viscous honey sticking to the containers. Moreover, since natural honey is ordinarily available only as a thick sticky fluid, it has not been possible prior to my invention to utilize honey in the preparation of dry packaged cake mixes and the like.

Thus, it will be seen that there has been a longfelt need for a honey product which is capable of meeting the requirements of the baking industry but which is free from the disadvantages and objectionable characteristics described above. It has been suggested in the prior art that by vacuum evaporation, liquid honey can be converted to a hard glassy solid suitable for packaging and sale in the form of lozenges or the like. However, it is recognized that a solid product of this type rapidly becomes sticky upon contact with atmospheric moisture because of the natural hygroscopic properties of the honey. Moreover, such a solid product is not suitable for bakery purposes unless it is first pulverized or ground to powdered form in which it can be readily measured and handled. Obviously, when in finely divided form such a solid product will absorb moisture to an even greater extent than before grinding and consequently cannot be readily obtained as a dry free-flowing powdered or granular material. In addition, the prolonged evaporation process results in a certain degree of chemical decomposition of the honey with consequent loss or impairment of the natural honey flavor.

Although liquid honey normally retains its liquid form for long periods of time because of the hygroscopic nature of the levulose contained in the honey, substantial crystallization or granulation will take place after an extended storage period, especially when the honey is exposed to low temperatures or when the levulose content is relatively low. However, crystallized or granulated honey is still a sticky unstable material which, because of its deliquescent properties, readily reverts to liquid form and, therefore, does not provide a solution to the problem of obtaining honey in a commercially acceptable non-sticky form which can be handled, stored, and utilized in much the same manner as sugar or other powdered or granular baking ingredients.

Accordingly, a primary object of my invention is to provide a novel solid form of honey which is suitable for baking and other purposes without the objections heretofore encountered in connection with liquid honey.

A further object of the invention is to provide a novel honey product in the form of a dry subdivided material which can be easily handled, stored, and utilized in substantially the same manner as sugar and other powdered or granular baking ingredients.

Another object of the invention is to provide a novel food composition in the form of a solidified material containing a substantial proportion of honey and capable of use as a source of honey for sweetening purposes in baking and the like.

An additional object of the invention is to provide a novel honey-containing product in the form of a free-flowing subdivided solid material which can be readily incorporated in packaged dry bakery mixes for use in baking cakes, cookies and the like.

A still further object of the invention is to provide a novel process for converting liquid honey to a solidified material suitable for use in baking and for other like purposes.

Other objects and advantages of the invention will become apparent from the subsequent detailed description.

Pursuant to the foregoing objects, I have found that a solidified material readily useable for baking and like purposes can be prepared by compositing extracted liquid honey with a starch material, particularly in gelatinized form, and subsequently drying the mixture. Broadly speaking, therefore, the novel food product of my invention comprises a dried composite of honey and a starch material such as natural, modified, or treated starch or a starch-containing substance such as flour. As will hereinafter appear, I prefer to employ the starch material in gelatinized form because of the greatly improved characteristics of the honey product containing gelatinized starch. From a process viewpoint, the invention in its broadest aspect involves mixing liquid honey with the starch material in suitable proportions and drying the resultant composition to obtain a subdivided solid material or one which can readily be reduced to powdered, granular, or other subdivided condition.

By the term "starch material" as employed in the specification and claims of this application I intend to include the various natural starches, the various modified and treated starches, and also natural starch-containing materials, particularly flour. Inasmuch as the principal use of my product is for baking purposes, I prefer to employ corn starch or wheat starch in the case of starches per se, and wheat flour in the case where flour is used as the starch material. However, it is also within the scope of the invention to utilize other starch materials.

For example, among the different kinds of natural starches which may also be employed in practicing the invention are rice starch, potato starch, tapioca starch, waxy maize starch, sweet potato starch and arrowroot. Examples of the modified or treated starches which may be utilized in the invention are the so-called gelatinized or pregelatinized starches, thick boiling starches and modifications thereof including neutral, alkali and chlorinated starches, thin boiling starches, and ethylated starches. In the case of flour, it is within the scope of the invention to utilize, in addition to wheat flour, any powdered starch-containing cereal grain or seed, such as corn flour, rye flour, soybean flour, buckwheat flour, potato flour, tapioca flour, rice flour and the like. When flour is employed as the starch-containing ingredient to be composited with the honey, I have found that best results are obtained when refined or deglutenized flour is used. This is particularly true in the case of wheat flour. The removal of gluten from the flour increases the relative proportion of starch in the flour thereby rendering it more suitable for the purpose of the present invention. Moreover, the use of deglutenized flour avoids the introduction of foreign flavors into the final honey product.

It will be understood that the honey-containing product of the present invention is intended as an improved and more convenient form of honey and its principal utility, therefore, is as a source of honey for baking and like purposes. As will hereinafter appear, the primary function of the starch material is to provide a satisfactory carrier or support for the honey permitting the latter to be reduced to a subdivided, free-flowing, non-sticky condition. However, to the extent that the product is to be used for baking purposes, the presence of a substantial amount of starch or flour in the powdered honey product is not to be considered as a disadvantage since starch, particularly as a component of flour, is normally one of the principal ingredients used in baking. In other words, although I have found it necessary to composite liquid honey with a starch material in order to obtain a solid honey product having the desired physical properties, the starch material is by no means a useless or undesirable ingredient when the product is employed for baking or like purposes.

Accordingly, it will be understood that it is generally desirable to obtain as high a proportion as possible of honey solids to starch material in the final product. The maximum quantity of honey solids which can be obtained in the final product depends on several factors. The carrying power of the starch material, i. e. its ability to retain honey in the form of a relatively non-sticky pulverulent material, will vary somewhat dependent upon the type of starch material used, its actual starch content in the case of flour, and as hereinafter explained, also upon the extent of gelatinization of the starch material. In addition, I have found that as the proportion of honey solids to starch material in the final product increases, the product becomes more difficult to dry and consequently may tend to become sticky and lose its desired free-flowing characteristics when in subdivided condition. Accordingly, there is usually a practical upper limit on the honey solids content which can be realized while at the same time obtaining the desired physical properties in the product. I have obtained highly satisfactory products containing at least about 45 weight per cent honey solids and ranging up to about 65 weight per cent honey solids. However, it is to be understood that higher proportions of honey solids to starch material may also be utilized in some cases. For example, honey-starch products containing as high as about 80–85 weight per cent honey solids have been prepared by resorting to extended drying periods as a result of the more difficult drying characteristics of the higher honey content mixtures.

The simplest and most economical drying method comprises heating the mixture of honey and starch material on trays in a tunnel dryer. Another method comprises the use of a pan-type evaporator under vacuum whereby to avoid the danger of excessive temperatures which may cause caramelization of the honey sugars or other deleterious decomposition reactions which would detract from the flavor and appearance of the finished product. During the drying or evaporation step the mixture may be continuously stirred or agitated if necessary in order to avoid localized overheating and consequent damage to the honey. As the mixture is dried it is first converted to a pasty dough-like condition and upon completion of the drying step the product is obtained in the form of a solid cake or lumps which are easily reducible to any desired state of subdivision by conventional crushing, pulverizing, or grinding techniques.

Another, although somewhat more costly, drying method comprises diluting the honey-starch material mixture with sufficient water to permit the mixture to be handled in a roller dryer or a spray dryer. In the case of spray-drying, any of the spray-drying techniques well known in the art may be used. I have obtained an excellent product by means of a vertical upflow countercurrent technique in which a honey-flour-water mixture is sprayed into a drying tower adjacent the top thereof and hot air is introduced into the tower adjacent the bottom thereof. When spray-drying is employed a free-flowing powdered product is obtained directly and it is often possible to obtain a product having a somewhat higher honey solids content without encountering objectional stickiness.

In order to improve the drying characteristics of the honey-starch material mixtures, particularly those having high honey contents, a small amount of edible carboxymethyl cellulose (e. g. from about 0.5 to about 3.0%) may be added if desired.

I have found that in order to obtain a satisfactory product having good drying properties and the desired free-flowing characteristics it is desirable to effect gelatinization of the starch component of the mixture, i. e. either the natural, modified or treated starch or the natural starch content of the flour. When contacted with water at room temperature starch or flour absorbs moisture to only a slight extent but upon heating the extent of water absorption increases markedly and is accompanied by a pronounced swelling action. This phenomenon is known as gelatinization or, more accurately, starch gelatinization since in the case of flour it is the starch constituents of the flour which absorb water and swell. Thus, when flour is employed as the starch material I prefer to use "cooked" flour, i. e. flour which has been contacted with a sufficient quantity of water at a sufficiently high temperature to effect starch gelatinization. For any given starch material, a certain minimum temperature and moisture content are usually required to obtain gelatinization, but these values will vary somewhat dependent upon the type of starch material used and, in the case of flour, upon the composition of the flour and the mechanical or chemical pretreatment to which it has been subjected. For purposes of my invention, gelatinized starch material is preferred because of the greater ease of drying and because of the greater carrying capacity for honey due apparently to the greatly increased surface area and absorptive capacity of the gelatinized starch.

In accordance with the preferred method of practicing my invention involving the use of a gelatinized starch material, the process may be carried out in any one of several ways. One method of practicing the invention comprises mixing liquid honey with the starch material, such as natural starch or raw flour, and heating the entire batch slowly to a gelatinizing or cooking temperature, preferably just below or substantially at the boiling point of the mixture, e. g. from about 185° F. to about 250° F. Agitation or stirring may be carried out during the heating or cooking step. Following the heating operation, the fluid mixture of honey and partially or completely gelatinized starch material is then dried in any suitable manner to obtain a dry powdered or granular material. Additional mixing between the heating and drying steps is desirable to insure uniformity.

In the foregoing method, gelatinization of the starch material is effected in the presence of the natural water content of the honey. Inasmuch as liquid honey in its natural state contains from about 14% to about 18% water by weight, gelatinization of the starch material can readily be obtained without the necessity of adding extraneous water. However, as an alternative method, extraneous water may be added to the initial mixture of honey and starch material and the process carried out as above. Obviously, however, if no extraneous water is added, the final drying of the product after gelatinization may be accomplished more rapidly and more economically. In some cases the honey may be heated first and added to the starch material accompanied by further mixing and heating. Also, if desired, the honey may first be subjected to partial dehydration in order to reduce its natural water content below the normal 14 to 18% level before adding the starch material and heating or cooking.

As a further modification of the process, I may also utilize pregelatinized starch material, i. e. starch material which has been gelatinized prior to admixture with the honey. Thus, raw starch or flour may first be cooked in water following which the honey is then added and the entire mixture heated further and reduced to dryness. If desired, the precooked mixture may be cooled prior to the addition of honey thereby minimizing the extent to which the honey is exposed to high temperatures during the process. Generally speaking, when pregelatinized starch materials are employed very little if any additional heating of the combined ingredients is necessary. Still another modification of the invention comprises precooking or pregelatinizing in water only a portion of the total amount of starch material used and then adding honey and the remaining portion of raw and uncooked starch material followed by drying of the mixture. In this manner, the starch material contained in the final product may be partly gelatinized and partly ungelatinized.

Gelatinization of the starch material after admixture with the honey, either with or without the addition of extraneous water, is simpler and more economical and results in a more homogeneous and intimate mixture. By carrying out the cooking operation or starch gelatinization while the starch material is mixed with the liquid honey medium and with adequate agitation either during or after gelatinization, it is believed that a much more intimate dispersion and distribution of honey solids on the gelatinized starch particles is obtained. Because the starch material is gelatinized with consequent swelling while completely surrounded by liquid honey, the gelatinized particles are apparently able to adsorb and retain a greater quantity of liquid honey than is the case when precooked or pregelatinized starch material is later mixed with liquid honey. Apparently, by this technique the starch particles as they swell during gelatinization actually envelop droplets of honey and the liquid honey impregnates or permeates the gelatinized particles much more completely than when pregelatinized starch material is combined with liquid honey and, as a result, upon final drying a more homogeneous and stable composite of somewhat higher honey solids content is realized. Accordingly, although pregelatinization is contemplated by the invention, I prefer to carry out the gelatinization step by first combining the starch material with the liquid honey and then heating in situ, i. e. in the presence of the honey.

The solidified honey-containing material obtained as the final product of my invention affords numerous advantages not previously available with liquid or even granulated honey. In the first place, the baker or housewife can easily handle the solidified honey product in contrast to the sticky mass obtained when attempts are made to utilize liquid honey in a baking operation. Conventional dry powder mixing machines can be used without any difficulty whatsoever since the product of my invention, when in subdivided or comminuted form, mixes readily with other solid or dry baking ingredients and does not result in the introduction of air into the bakery dough as is often the case when liquid honey is employed. Because of the foregoing physical properties, commercial bakers can now for the first time introduce a substantial amount of honey into the formulas employed in the preparation of specially packaged dry cake mixes, cookie mixes, biscuit mixes, and the like. Moreover, the natural, modified, or treated starch or the flour comprising the vehicle or carrier for the honey is a useful ingredient in the baking formula rather than being an extraneous material having no value in the ultimate use of the product.

In addition, substantial savings can be realized in the packaging of the product of the present invention since it can be packed in moisture-proof non-metallic cartons, if desired, instead of the relatively expensive metal or glass containers necessary in the case of liquid honey. Also, as hereinbefore mentioned, there is substantially no loss of the honey product as a result of sticking of the honey to the interior of the container. In the case of liquid honey, it is well known that bakers customarily experience excessive losses because of the sticky adherent nature of liquid honey when packaged in metal containers. My starch-containing product is also considerably less expensive and has substantially better keeping qualities than other honey products heretofore proposed, e. g. a honey-milk solids product.

For purposes of illustrating my invention, but not by way of limitation, the following specific examples are presented:

Example I

Mixtures of extracted liquid honey and corn starch containing about 50%, 55%, and 60% by weight of honey were prepared. After thorough mixing the composites were steamed at 212° F. for twenty minutes. After further mixing to insure uniformity, the compositions were spread in thin layers on trays and dried in a tunnel drier for 24 to 36 hours at 130–140° F. The resultant products were cooled to 70–75° F. and ground to a fine powder in a hammer mill. The final product in each case was a free-flowing powder having a satisfactory light color with excellent honey flavor, texture, and solubility. The honey solids content ranged from about 43% to about 54% by weight.

Example II

Following the same general procedure described in Example I, about 70% by weight of extracted liquid honey was mixed in separate batches with (1) wheat starch, (2) a thick boiling starch, (3) a thin boiling starch, and (4) corn starch. After heating, mixing, drying, cooling, and grinding, powdered products of good color and honey flavor were obtained containing about 63% by weight of honey solids.

Example III

A mixture of 100 lbs. extracted liquid honey containing about 17% water and 100 lbs. of hard wheat flour was prepared in a cooking kettle. This mixture was cooked at a temperature of from about 175° F. to about 190° F. with continuous stirring for a period of about 15 to 20 minutes.

Following the cooking operation in which the starch content of the flour was gelatinized by means of the natural water content of the honey, the cooked mixture was transferred into a vacuum pan drier provided with stirring means. Over a period of several hours, the mixture was reduced to dryness with continuous stirring under a partial vacuum of from about 24 to about 28 inches of mercury.

Upon completion of the drying step a frangible solid material containing about 45% honey solid was obtained which was readily reducible to a free-flowing, non-sticky powdered or granular condition by means of crushing rolls.

Example IV

A mixture of extracted liquid honey, hard wheat flour, and water was prepared in the following proportions:

| | Pounds |
|---|---|
| Honey | 9.5 |
| Flour | 9.5 |
| Water | 115.0 |

This mixture was prepared at room temperature in a cooking kettle and then gradually heated with continuous agitation to a temperature of about 190° F. whereby to effect cooking of the flour, i. e. gelatinization of the starch content thereof. Following the cooking operation, the mixture was pumped to the spray nozzles of a vertical upflow countercurrent spray-drying tower in which hot air was introduced at the bottom of the tower.

A fine free-flowing non-sticky powder containing approximately 45% honey solids was recovered directly from the bottom of the spray-drying tower.

I claim:

1. A honey-containing product comprising a dried composite of honey and a gelatinized starch material, said product containing at least about 45 weight per cent honey solids.

2. The product of claim 1 further characterized in that said starch material is selected from the group consisting of natural starches, modified starches, treated starches, and flours.

3. A honey-containing product comprising a dried composite of honey and a carrier material, said carrier material comprising gelatinized starch and said product containing at least about 45 weight per cent honey solids.

4. A honey-containing product adapted for use in baking and the like comprising honey and a gelatinized starch material in subdivided dried condition, said product containing at least about 45 weight per cent honey solids.

5. A honey-containing product comprising a subdivided, free-flowing, substantially non-sticky composite of a starch material and honey solids, said product containing at least about 45 weight per cent honey solids.

6. A solidified honey-containing product comprising a dried composite of a gelatinized starch material as a carrier and honey solids deposited thereon, said product containing at least about 45 weight per cent honey solids.

7. A honey-containing product comprising a dried composite of honey and a gelatinized starch material, said product containing honey solids in an amount of from about 45% by weight to about 65% by weight.

8. A honey-containing product comprising a dried substantially homogeneous composite of a gelatinized starch material and honey solids, said honey solids being intimately dispersed in the starch material and supported thereon as a result of gelatinization of said starch material in the presence of liquid honey, and said product containing at least about 45 weight per cent honey solids.

9. A solidified honey product comprising a dried composite of honey and gelatinized corn starch, said product containing at least about 45 weight per cent honey solids.

10. A solidified honey product comprising a dried composite of honey and gelatinized wheat starch, said product containing at least about 45 weight per cent honey solids.

11. A solidified honey product comprising a dried composite of honey and cooked flour, said product containing at least about 45 weight per cent honey solids.

12. A solidified honey product comprising a dried composite of extracted liquid honey and gelatinized deglutenized flour, said product containing at least about 45 weight per cent honey solids.

13. The product of claim 11 further characterized in that said flour comprises wheat flour.

14. A honey-containing product comprising a dried composite of honey and cooked flour, said flour having its starch content gelatinized to a substantial extent whereby to increase its absorptive capacity and carrying power for the honey, and said product containing at least about 45 weight per cent honey solids.

15. A process for preparing a honey-containing product in solidified form comprising forming a composite of liquid honey and a gelatinized starch material, and reducing the resultant mixture to dryness, said honey being present in sufficient amount so that the final product contains at least about 45 weight per cent honey solids.

16. A process for preparing a honey-containing product in solidified form comprising combining a starch material with liquid honey, gelatinizing the starch material by heating in the presence of the natural water contained in the honey without the addition of extraneous water, and reducing the resultant mixture to dryness, said honey being present in sufficient amount so that the final product contains at least about 45 weight per cent honey solids.

17. A process for preparing a honey-containing product in solidified form comprising combining a starch material, liquid honey, and added water, heating the mixture to an elevated temperature to effect gelatinization of the starch material, and reducing the resultant mixture to dryness, said honey being present in sufficient amount so that the final product contains at least about 45 weight per cent honey solids.

18. A process for preparing a honey-containing product in solidified form comprising combining a pregelatinized starch with liquid honey, and reducing the resultant mixture to dryness, said honey being present in sufficient amount so that the final product contains at least about 45 weight per cent honey solids.

19. A process for preparing a honey-containing product in solidified form comprising combining raw flour and liquid honey, heating the mixture to a cooking temperature to effect gelatinization of the starch content of the flour, and reducing the resultant mixture to dryness, said honey being present in sufficient amount so that the final product contains at least about 45 weight per cent honey solids.

20. A process for preparing a honey-containing product in solidified form comprising cooking raw flour in water, combining the precooked flour with liquid honey, and reducing the resultant mixture to dryness, said honey being present in sufficient amount so that the final product contains at least about 45 weight per cent honey solids.

References Cited in the file of this patent

UNITED STATES PATENTS

| Number | Name | Date |
| --- | --- | --- |
| 1,186,768 | Gould | June 13, 1916 |
| 1,368,792 | Goodwin | Feb. 15, 1921 |
| 1,424,927 | Luft | Aug. 8, 1922 |
| 1,528,820 | Fink | Mar. 10, 1925 |

FOREIGN PATENTS

| Number | Country | Date |
| --- | --- | --- |
| 1,310 | Great Britain | 1885 |